3,598,627
FUNGUS-RESISTANT SHINGLES
Morris Klimboff, Plainview, N.Y., assignor to
The Flintkote Company, New York, N.Y.
No Drawing. Filed Sept. 20, 1967, Ser. No. 669,292
Int. Cl. B44d 1/12
U.S. Cl. 117—25                                          12 Claims

ABSTRACT OF THE DISCLOSURE

There is disclosed herein a fungus-resistant and alga-resistant composition shingle suitable for roofing and siding made of an asphalt-impregnated base that contains embedded on a portion or on all of its weathering surface granular zinc or a granular zinc-containing material along with the usual colored granules on such surfaces.

---

This invention relates to fungus-resistant and alga-resistant building shingles, and more particularly to composition shingles made from an asphalt-impregnated base carrier having embedded on their weathering surfaces the usual granular weathering materials known in the shingle art and granular zinc or zinc-containing materials.

Premanently colored building shingles of asphalt-impregnated materials are becoming increasingly popular. The exposed weathering surfaces of such shingles generally are heavily coated with granular materials embedded in the asphalt-impregnated base structure. The granules are commonly of crushed rock, crushed slate or particulate matter of similar nature which have permanent coloration that ordinarily is inherent in the material. Thus, in contrast to wooden shingles that continually require regular painting or staining, the coloring of these shingles is achieved at the time of their manufacture by selection of the colored crushed granules to be embedded in the weathering surface. The granular material, and thus the shingle itself, retains its color. Having an exposed weathering surface that retains its color and appearance over a long period of time is, of course, a desideratum for building roofings and shingles.

Most of the permanent colors heretofore used to make composition shingles have been dark. Lighter colors, however, are becoming more popular, particularly in warm temperate climates. Light colors are desirable in such regions because they reflect heat from sunlight and thus help maintain lower temperatures within a dwelling or other building.

A serious problem with light-colored composition roofing and siding shingles is their darkening, discoloration and staining caused by fungi and algae. It presently is thought that various fungi and algae grow on air-borne particles of dirt that naturally settle onto roofs and sides of buildings. Such fungi and algae continue to live on composite shingles covering such buildings amid the embedded granular particles on the weathering surface of the shingles, and cause discoloration that is particularly noticeable and objectional on light-colored shingles. That discoloration also reduces the light-reflecting ability of the shingles.

The increasing use of insulation in dwellings and other buildings appears to promote indirectly the growth of fungi and algae on exterior shingles. In winter the interior heat of a building is confined by the insulation whereas in the summer the coolness of the interior, especially in air-conditioned structures, is maintained by the insulation. Both these conditions tend to keep the roofing and the siding on the building moist, an environmental condition which tends to sustain the fungi and algae. That situation is especially prevalent in warm temperature regions, such as in the southern United States along the Gulf Coast where the moisture content of the atmosphere generally is high. It is in such regions that the discoloration and staining of light-colored shingles by fungi and algae are noticeably unpleasant. Moreover, although the problem of discoloration due to fungi and algae growth on composition shingles originally was thought to be a regional phenomenon warmer, moist, temperate areas, it is increasingly becoming a problem in other areas, perhaps due to the greater usage of insulation, air-conditioning and lighter colors.

Most of the organisms found on roofs and sidings have been fungi or algae of the air-borne type, and mainly of family Volvocaceae and Myxophyceae.

The fungi and algae adhere tenaciously to composition shingles and are difficult to remove by ordinary washing. Thus it has been suggested to wash the shingles with various kinds of fungicides and with chlorine solutions. The results, even if satisfactory, however, have been of short duration and not wholly commensurate with the expense involved. In addition to having to repeat such washings, the active ingredients in the washing solutions pose a real threat to flowers and shrubbery near the building, tend to cause corrosion, and may themselves cause discoloration, e.g., by interaction with components of the roofing and siding shingles.

Painting has been used as a means to overcome fungus- and alga-caused discoloration. In some areas it has become an accepted maintenance practice to paint white or light-colored roofs and sidings at regular intervals. The inherent cost of such a practice is obviously a disadvantage, especially since the use of roofing and siding shingles is partly to avoid painting and similar maintenance. Moreover, longer-lasting oil-base paints often tend to cause discoloration by dissolution in the paint vehicle of asphaltic components of the shingle base, so-called "bleeding." Water-base latex paints, on the other hand, tend to cause curling of the shingles. In any event, paints also are subject to fungus- and alga-caused discoloration.

Prevention of fungi and algae attacks on composition roofing and siding shingles by including fungicides in or on the shingles has not heretofore been practical or even possible. Desiderata of such fungicides are that they should be effective over the life of the shingles, should be applicable to the shingles in the course of their regular manufacturing process and should not discolor, cause corrision, interact with components in the shingle or migrate. Known and commonly used fungicides do not satisfactorily meet those conditions.

It is an object of this invention to provide composition roofing and siding shingles that are resistant to fungi and algae and are therefore substantially free from them.

It has been found that fungus-caused and alga-caused discoloration and staining of roofing and siding shingles can be prevented by embedding onto the weathering surfaces of the shingles particulate zinc or particulate zinc-containing materials along with the usual colored granular components on such surfaces. The zinc inhibits growth of algae and fungi on the shingles over a long period of time, substantially eliminates discoloration and staining caused by such growth, especially on light-colored shingles in warm, moist, temperate regions, and contributes to the appearance and useful life of the shingles by overcoming other of the disadvantages discussed hereinbefore.

A surprising aspect of this invention is the apparent ability of the zinc to inhibit fungi and algae growth in adjacent areas so that it is possible to include the granular zinc or zinc-containing material in a relatively small section of a shingle, such as in a strip near the upper end, and yet still to obtain its beneficial effects. The zinc or zinc-containing component also has the advantage of being applicable to the shingle by ordinary manufacturing procedures, e.g., along with the basic granulated weathering material.

The amount of zinc based on the amount of the other granular components and any carrier for the zinc can vary over a wide range. A desirable and practical range presently appears to be from about one-half percent to about twenty percent of zinc by weight based on the amount of the other granular components; a more preferable range is from about two percent to about fifteen percent.

Except for the zinc or the zinc-containing component, the other materials and their amounts are those known and conventionally used in the asphalt-based composition shingle industry.

EXAMPLE 1

Shingles were made from a suitable felt, No. 55, impregnated to 185% of saturation with a heavy asphalt. Typical asphalts or bitumens that have been used for this purpose have specific gravities ranging from about .99 to 1.27 viscosities from about 18 to about 1450 seconds Saybolt-Furol at 350° F., and softening points from about 160° F. to about 235° F. The shingles contained embedded on their weathering surfaces a mixture of 35.04 pounds per gross square of white granules, Minnesota Mining & Mfg. Co. LR–96, and 1.20 pounds per gross square of zinc particles had the following distribution.

| Mesh: | Percent |
| --- | --- |
| +10 | 0.0 |
| −10 +14 | 13.3 |
| −14 +20 | 37.0 |
| −20 +28 | 33.6 |
| −28 +35 | 13.3 |
| −35 | 1.8 |

By volume, the white rock granules were about 64 times the volume of the zinc particles.

These shingles were placed on the roofs of buildings located in towns near the Gulf of Mexico. The roofs had various orientations to sunlight. Control shingles substantially identical to the shingles described except without zinc granules also were placed on the roofs in corresponding orientations for comparison. Observation after about three years revealed that the shingles having zinc particles had discolored to a much less extent than the control samples.

EXAMPLE 2

Shingles comparable to those described in Example 1 were prepared containing 34.14 pounds per gross square of white rock granules and 2.10 pounds per gross square of the particulate zinc (about 32:1 by volume). These shingles were tested as described in Example 1, and were found to have discolored considerably less than the shingles described in Example 1.

EXAMPLE 3

Shingles comparable to those described in Example 1 were prepared containing 32.34 pounds per gross square of white rock granules and 3.90 pounds per gross square of the particulate zinc (about 16:1 by volume), and were tested as described in Example 1. These shingles were found to have discolored considerably less than the correspondingly exposed control samples and less than the shingles described in Example 1.

It should of course be understood that the foregoing examples are set forth to illustrate the invention described herein above, and that numerous changes in the proportions, ingredients and methods disclosed can be made by persons skilled in the art without departing from the scope of the invention as defined in the claims appended hereto.

I claim:
1. A permently colored fungus-resistant and alga-resistant composition shingle suitable for roofing and siding which comprises a base carrier sheet, an asphaltic material impregnated into said base carrier sheet, and a weathering coating on one face of said asphalt-impregnated base carrier sheet, said weathering coating comprising a predetermined proportionate coating of a hard, granular, permanently colored weathering material and granular zinc embedded into said asphaltic material, said shingle permanent color being substantially due to said permanently colored granular weathering material, said granular zinc inhibiting discoloration of said shingle without altering the color of said shingle due to the presence thereon of said granular zinc.

2. A permanently cvolored fungus-resistant and alga-resistant composition shingle according to claim 1 wherein said granular weathering material and said granular zinc are substantially uniformly distributed entirely over the weathering coating of said base carrier sheet.

3. A permanently colored fungus-resistant and alga-resistant composition shingle according to claim 1 wherein said granular weathering material is substantially uniformly distributed entirely over the weathering coating of said base carrier sheet and said granular zinc is distributed over a portion of the weathering coating of said base carrier sheet.

4. A permanently colored fungus-resistant and alga-resistant composition shingle according to claim 3 wherein said granular zinc is substantially uniformly distributed in a strip over the weathering coating of said base carrier sheet.

5. A permanently colored fungus-resistant and alga-resistant composition shingle according to claim 4 wherein said strip is adjacent the upper butt part of said shingle.

6. A permanently colored fungus-resistant and alga-resistant composition shingle according to claim 1 wherein substantially all of said granular zinc is finer than 10 mesh.

7. A permanently colored fungus-resistant and alga-resistant composition shingle according to claim 6 wherein substantially all of said granular zinc is larger than 35 mesh.

8. A permanently colored fungus-resistant and alga-resistant composition shingle according to claim 1 wherein the amount of said zinc is between about one-half percent and about twenty percent by weight based on the amount of non-zinc material on said weathering coating.

9. A permanently colored fungus-resistant and alga-resistant composition shingle according to claim 1 wherein the volume of said zinc is between about one-sixty fourth and about one-sixteenth the volume of said granular weathering material.

10. A permanently colored fungus-resistant and alga-resistant composition shingle according to claim 1 wherein said base carrier sheet is felt.

11. A permanently colored fungus-resistant and alga-resistant composition shingle according to claim 1 wherein the amount of said granular weathering material is about 34 pounds per gross square of said shingle and the amount of said zinc is between about 0.17 and 6.8 pounds per gross square of said shingle.

12. A permanently colored fungus-resistant and alga-resistant composition shingle according to claim 1 wherein said asphaltic material has a specific gravity of between about 1.01 and about 1.27, a viscosity of between about 18 and about 1450 seconds Saybolt-Furol at 350° F., and a softening point of between about 160° F. and about 210° F.

References Cited

UNITED STATES PATENTS

| | | | |
|---|---|---|---|
| 3,484,267 | 12/1969 | Sadler | 117—25 |
| 1,574,615 | 2/1926 | Fleming | 117—31 |
| 1,720,708 | 7/1929 | Young | 117—31 |
| 1,920,931 | 8/1933 | Finley | 117—31 |
| 2,206,915 | 7/1940 | Ochs | 117—24 |

FOREIGN PATENTS

| | | | |
|---|---|---|---|
| 193,006 | 11/1923 | Great Britain | 117—30 |
| 211,128 | 11/1924 | Great Britain | 117—30 |

OTHER REFERENCES

Salvin, S. B., "Influence of Zinc Oxide on Paint Molds," Ind. and Eng. Chem., April 1944, vol. 36, No. 4, pp. 336–340.

Block, S. S., "Chemicals for Fungus Control," Chemical Week, Jan. 26, 1952, pp. 22 and 25.

WILLIAM D. MARTIN, Primary Examiner
R. M. SPEER, Assistant Examiner

U.S. Cl. X.R.

106—15AF; 117—30, 31, 32